United States Patent
Vauter

Patent Number: 5,863,034
Date of Patent: Jan. 26, 1999

[54] WORK PIECE STAND

[76] Inventor: Andrew F. Vauter, 16448 Clay St., Hebron, Ind. 46341

[21] Appl. No.: 736,448

[22] Filed: Oct. 24, 1996

[51] Int. Cl.⁶ .................................................. B23K 7/10

[52] U.S. Cl. ............................ 269/51; 269/17; 269/60; 269/61; 269/71

[58] Field of Search ............................ 269/17, 61, 50, 269/51, 52, 71, 60; 254/DIG. 16, 7 B, 7 C, 98

[56] References Cited

U.S. PATENT DOCUMENTS

| | | | |
|---|---|---|---|
| 1,305,321 | 6/1919 | Tooker | 269/71 |
| 1,331,938 | 2/1920 | McConnell et al. | 269/17 |
| 1,363,020 | 12/1920 | Shewalter | 269/17 |
| 1,481,503 | 1/1924 | Carswell et al. | 269/17 |
| 2,188,433 | 1/1940 | Friese . | |
| 2,814,099 | 11/1957 | Knittel | 269/17 |
| 2,827,690 | 3/1958 | Brown | 269/17 |
| 3,381,953 | 5/1968 | Miller . | |
| 3,851,857 | 12/1974 | Notgrass . | |
| 3,948,484 | 4/1976 | Tesinsky . | |
| 3,977,662 | 8/1976 | Cook | 269/20 |
| 4,067,562 | 1/1978 | Weber | 269/71 |
| 4,099,634 | 7/1978 | McIntire et al. . | |
| 4,118,010 | 10/1978 | Hanscom . | |
| 4,239,196 | 12/1980 | Hanger . | |
| 4,317,560 | 3/1982 | Troyer | 269/71 |
| 4,588,346 | 5/1986 | Smith . | |
| 4,599,034 | 7/1986 | Kennedy et al. | 269/71 |
| 4,691,904 | 9/1987 | Armstrong . | |
| 4,771,980 | 9/1988 | Dubbs et al. | 269/71 |
| 4,896,869 | 1/1990 | Takekoshi | 269/71 |
| 4,932,639 | 6/1990 | Fjellstrom . | |
| 4,993,686 | 2/1991 | Diaz . | |
| 5,259,602 | 11/1993 | Rogos . | |
| 5,338,015 | 8/1994 | Liegel et al. . | |
| 5,358,217 | 10/1994 | Dach . | |
| 5,632,475 | 5/1997 | McCanse | 269/71 |

OTHER PUBLICATIONS

Andrew F. Vauter, Declaration Pursuant to 37 CRF § 1.56, Feb. 24, 1997.

*Primary Examiner*—Robert C. Watson
*Attorney, Agent, or Firm*—Wallenstein & Wagner, Ltd.

[57] ABSTRACT

A work piece stand is described which includes a vertical post, an arm, and means for securing the work piece to the arm. Attached to the arm is a panel member and a support bar extending perpendicularly outwardly therefrom. Both the panel member and the support bar have apertures for securing the arm to the work piece. A pivoting means pivotally interconnects the arm to the post and divides the arm into a first arm portion and a second arm portion. The second arm portion is selectively extendable to a position where the center of gravity of the combination of the arm, the work piece and the securing means is disposed substantially along the axis of rotation of the pivoting means, thereby making the work piece easy to position for performing work thereon.

4 Claims, 3 Drawing Sheets

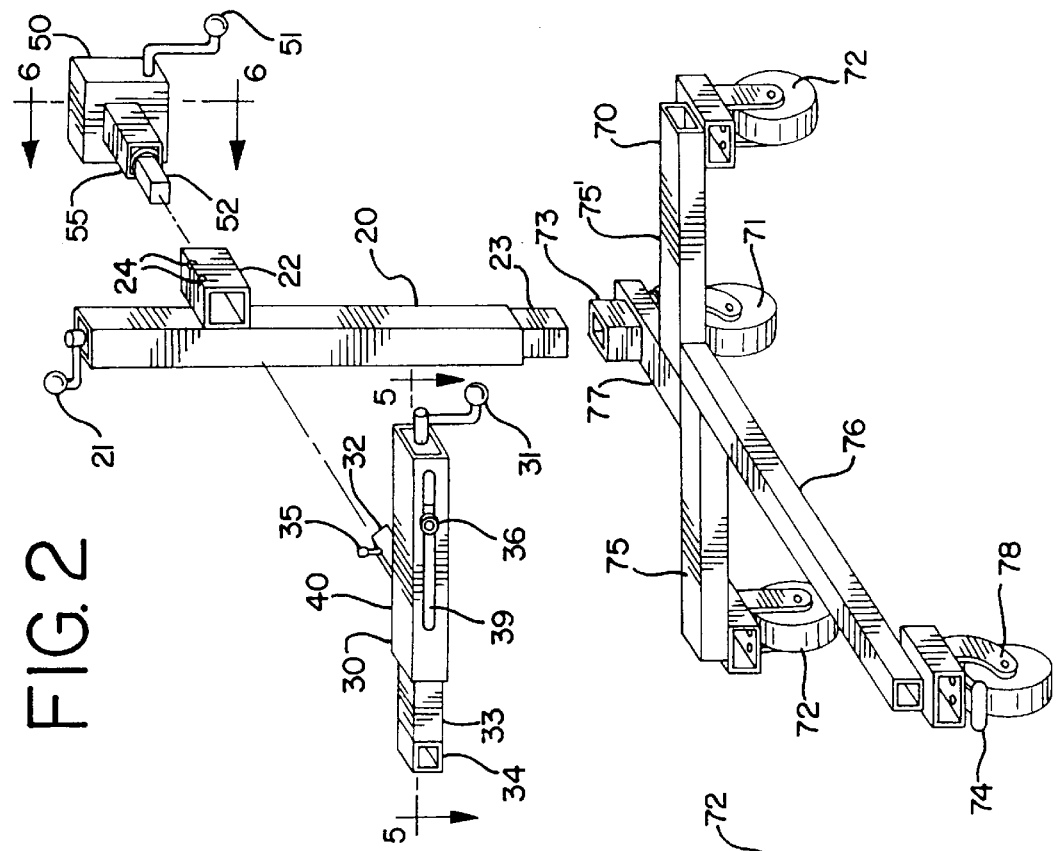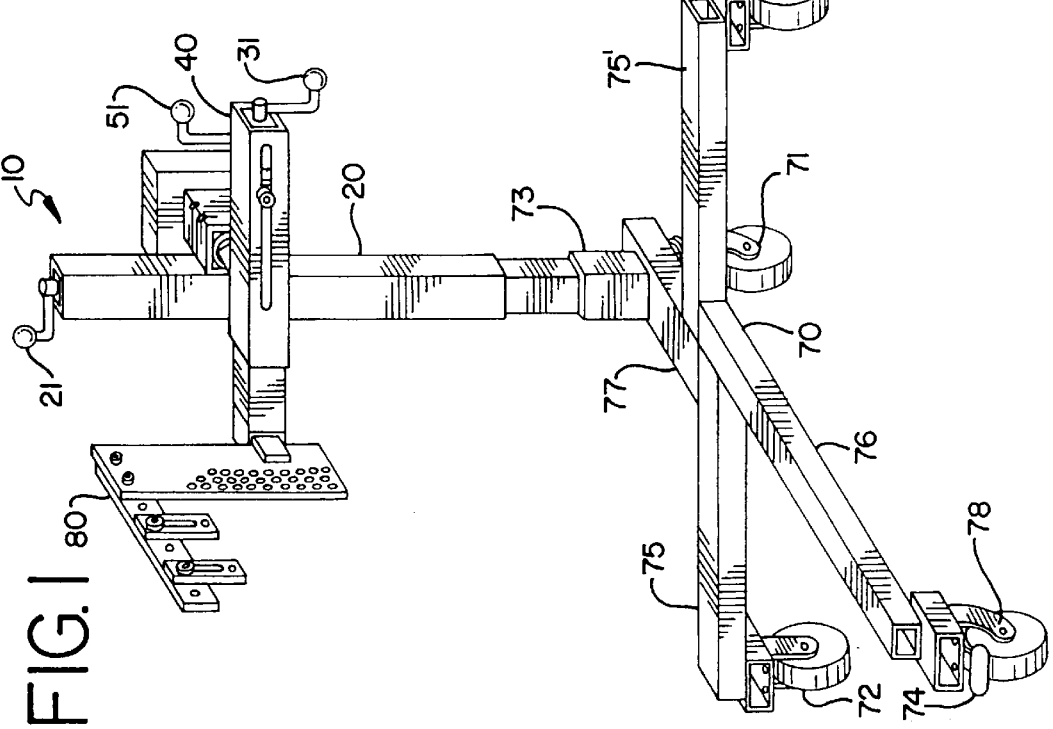

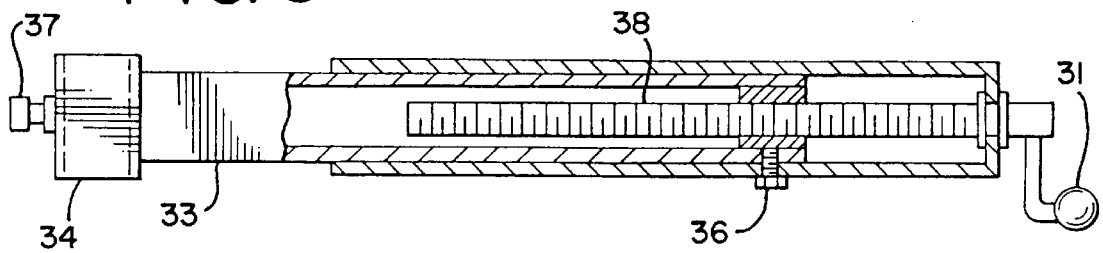
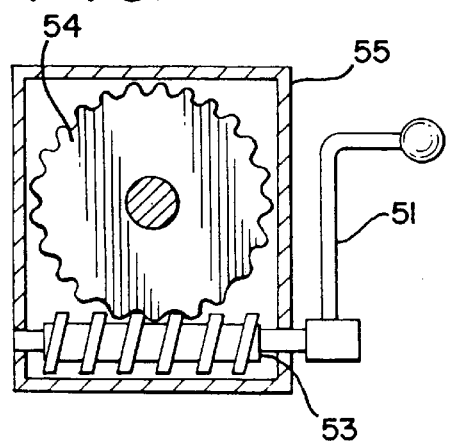
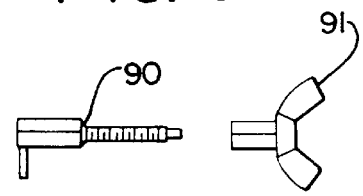
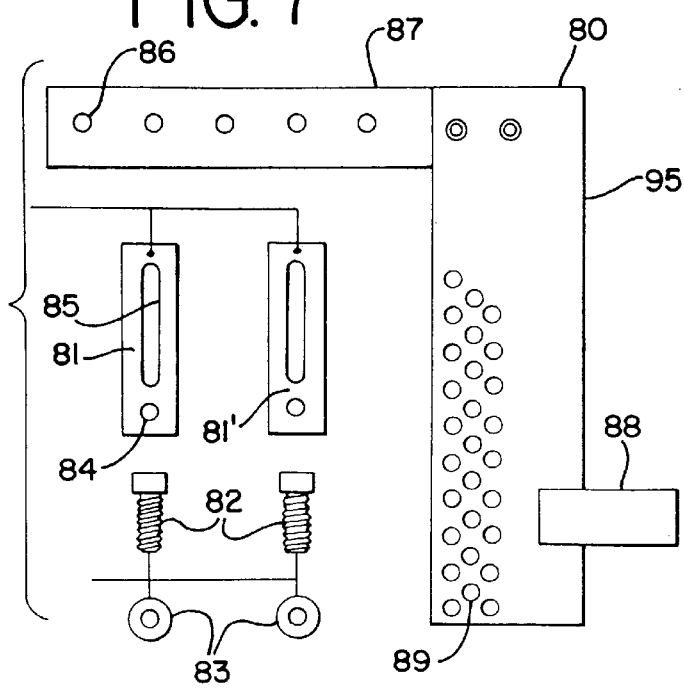
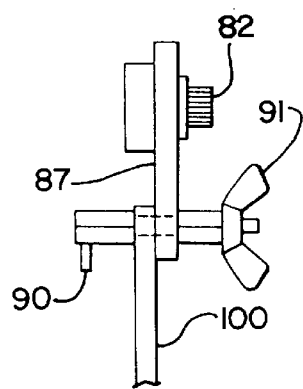

WORK PIECE STAND

DESCRIPTION

1. Technical Field

The present invention relates to an apparatus for supporting a work piece, for example a transmission.

2. Background Prior Art

There are several apparatus known in the art for lifting and manipulating heavy work pieces, for example, automobile engines or transmissions, so that work can be performed on the work piece. Such apparatus include those disclosed in U.S. Pat. Nos. 4,691,904, 4,993,686, and 5,259,602. However, after the work pieces are mounted on the prior art devices, the work pieces are relatively difficult to manipulate into different positions. Some of the prior art devices can only accommodate limited types of mounting configurations. Others can only mount the work piece in a limited number or range of positions.

U.S. Pat. No. 4,691,904 discloses an automatic or standard transmission handling device. The means for supporting the work piece to the device consists of two lateral arms which engage either side of the transmission. The device is therefore limited to only supporting a work piece that can be accommodated by the two arms. Additionally, the arms support the work piece at a distance from the arms' axis of rotation. Thus, to reposition or manipulate the work piece, one must expend considerable energy using a crank or manpower to rotate the work piece around the devices' axis of rotation. Also, since there is a considerable torque exerted on the axis, extensive braking and locking means must be included to prevent accidental rotation.

U.S. Pat. No. 4,993,686 discloses a transmission work station. This device requires nine different assemblies for accommodating different types of transmission configurations. The work station only allows 90° rotation of the work piece, depriving a technician from access to the reverse side of the transmission once the transmission is mounted.

U.S. Pat. No. 5,259,602 discloses a stand for front wheel drive transmissions. The work piece must be mounted using an adapter plate, which is external to the stand. After the work piece is mounted, the work piece can be manually rotated in one plane and can be pivoted 90° in a second plane. However, to accomplish the rotation, a separate leverage bar attachment piece must be implemented to allow the transmission to be swung around the arms' laterally disposed axis. After the transmission is repositioned, the stand must be locked into place in order to prevent the transmission from accidentally falling back into the original position.

SUMMARY OF THE INVENTION

It is an object of the present invention to provide a stand for supporting large, heavy objects, such as an automobile transmission, that overcome limitations of the prior art.

According to one aspect of the invention, the stand includes a vertical post, an elongated arm divided into a first arm portion and a second arm portion, means for pivotally interconnecting the arm to the post and defining an axis of rotation, means for securing the work piece to the arm, and means for selectively positioning the arm relative to the post to maintain the center of gravity of the combination of arm, securing means, and work piece disposed substantially along the axis of rotation.

For a better understanding of the invention, reference may be had to the following specification taken in conjunction with the following drawing. Furthermore, other features and advantages of the invention will be apparent from the following specification taken in conjunction with the following drawings.

BRIEF DESCRIPTION OF DRAWINGS

FIG. 1 is an elevational view of the preferred embodiment of the present invention;

FIG. 2 is an elevational view of the preferred embodiment of the present invention illustrating an exploded view of the arm and pivoting means assembly;

FIG. 5 is a plan view of the preferred embodiment of the arm illustrated in FIGS. 1–4, including a partial cut-away view of the arm;

FIG. 6 is a cross-sectional view of the preferred embodiment of the pivoting means that is illustrated in FIGS. 1–4.

FIG. 7 is a view of the components of the preferred embodiment of the securing means of the invention as illustrated in FIGS. 1–4.

FIG. 8 is a side view of the bolt and wing nut used to secure the work piece in the preferred embodiment that is illustrated in FIGS. 1–4.

FIG. 9 is a side view of the support bar and bracket assembly as constructed in the preferred embodiment that is illustrated in FIGS. 1–4.

DETAILED DESCRIPTION

Figure 4:
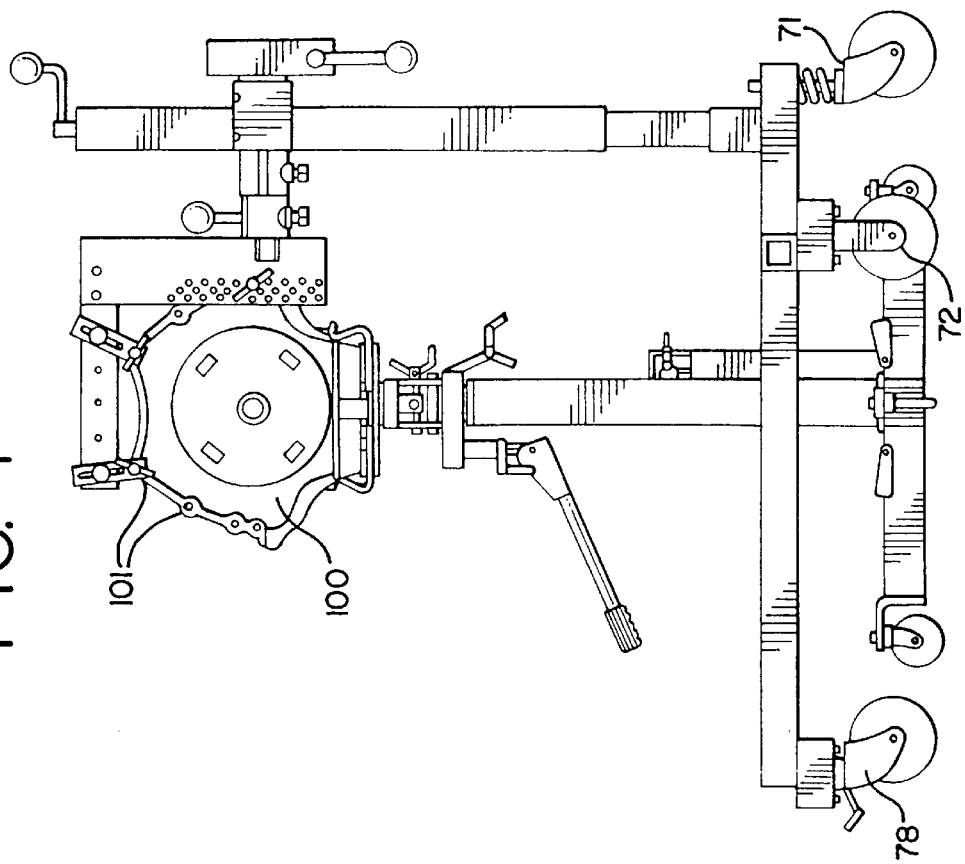
FIG. 4 is a side plan view of the preferred embodiment of the present invention illustrating the mounting of a work piece that is supported by an external lifting apparatus.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

Figure 3:
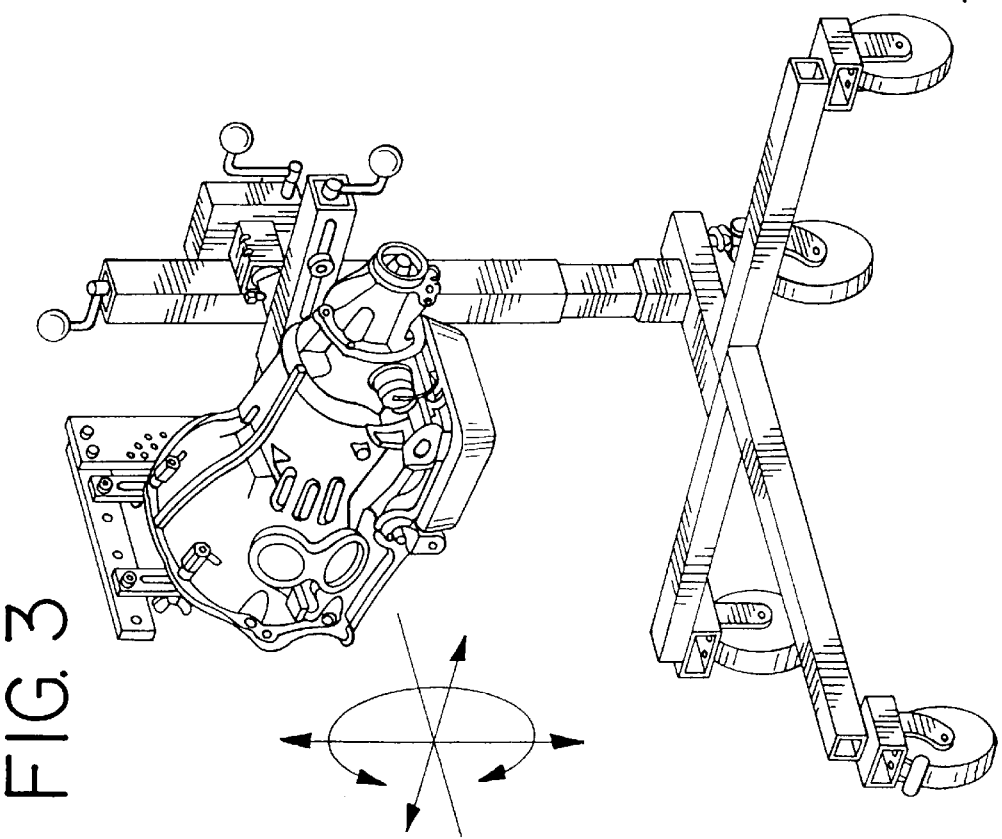
FIG. 3 is an elevational view illustrating a work piece mounted on the preferred embodiment of the present invention.

In the preferred embodiment, shown in FIGS. 1 and 2, a work piece stand 10 has a vertical post 20 and an elongated arm 40. Means for pivoting 50 the arm 40 interconnects the arm 40 to the post 20 and defines an axis of rotation 1, as illustrated in FIG. 3. Attached to the arm 40 is means for securing 80 a work piece to the arm 40. The arm 40 is telescopically extendable for selectively positioning the arm 40 relative to the post 20 to maintain the center of gravity 2 of the combination of the arm 40, securing means, and work piece 100 disposed substantially along the axis of rotation 1 of the pivoting means.

The post 20 is a telescopically extendable vertical column for raising or lowering the work piece 100, as illustrated in FIGS. 3 and 4. The post 20 has an inner column 23 slidably disposed within an outer column 24. The outer column 24 extends upward relative to the lower column 23 by rotating the handle 21. Rotating the handle 21 extends the post 20 by the same type of gear mechanism that is used for extending the arm 40, as described in further detail below. A first end of the post 20 is attached to a base portion 70 and a second end is interconnected to the pivoting means.

The arm 40 is divided into a first arm portion 30 and a second arm portion 33. The second arm portion 33 is selectively extendable from the first arm portion 30 by rotating the handle 31, as shown in FIG. 5. The handle 31 in turn rotates a threaded shaft 38 that is threadedly connected to the second arm portion 33. As the shaft is rotated, the second arm portion 33 extends or contracts, depending on which direction the handle is rotated, relative to the first arm portion 30.

In the preferred embodiment, the securing means consist of a securing assembly 80 including a panel member 95 and support bar 87, as shown in FIGS. 1, 7, 8 and 9. The panel member 95 is attached to the second arm portion 33 by an extension 88, which is received by sleeve 34 and secured by bolt 37. The panel member 95 extends perpendicularly from the second arm portion 33. The panel member 95 is attached to a support bar 87 that also extends perpendicularly away from the arm 40 and in line with the panel member 95. In the preferred embodiment, the first retaining elements on the work piece 100 are apertures 101 and the second retaining elements on the securing means are apertures. The panel member 95 has a plurality of apertures 89, and the support bar also has a plurality of apertures 86.

With reference to FIG. 7, a plurality of brackets 81 are connected to the support bar 87. Each bracket 81 includes an aperture 84 and an elongated eyelet 85. As described above, the work piece 100 must include a plurality of apertures 101 for securing the work piece 100 to the arm 40, using the securing assembly 80, as shown in FIGS. 3 and 4. The work piece 100 is attached to the arm 40 by cooperatively joining at least one bracket aperture 84 and one panel member aperture 89 with respective work piece apertures 101 and securing each pair of cooperative apertures with a bolt 90 and wing nut 91, as shown in FIGS. 3, 4 and 9.

Pivoting means interconnect the arm 40 to the post 20 and define an axis of rotation 1. In the preferred embodiment, the pivoting means is a worm gear assembly 50. The worm gear assembly consists of a worm gear housing 55 containing a worm 53, a worm gear 54 and a rotatable shaft 52, as shown in FIGS. 2 and 6. In the preferred embodiment, the worm gear 54 to worm 53 ratio 40:1, thereby providing a non-back-driving, or self-locking gear. Although any gear ratio should provide an operable work piece stand, a non-back-driving gear is preferable, because it eliminates the need for a secondary braking system and thereby increases the safety of the work piece stand.

The rotatable shaft 52 is connected on a first end to the worm gear 54 and is partially enclosed by and extends from the worm gear housing 55. As shown in FIG. 2, the worm gear housing 55 slides through and mounts within a receiving sleeve 22 of the post 20 and is secured within sleeve 22 by bolts 24. The worm gear assembly 50 can be selectively mounted with handle 51 located on either side of post 20. After the worm gear assembly 50 is mounted in sleeve 22, the rotatable shaft 52 is attached to the first arm portion 30 by the receptacle 32 and secured by the bolt 35. The base portion 70 has four legs 75, 75', 76, 77 for engaging the ground and for supporting the post 20. As shown in FIG. 2, the post 20 is received in the receptacle 73 on one leg 77. The legs 75, 75' are substantially parallel to one another, and the other two legs 74, 77 are substantially perpendicular to the legs 75, 75'. A caster 72 is attached to each leg 75, 75'. A caster 78 is attached to leg 76. A caster 71 is attached to leg 77. As shown in FIG. 4, the caster 71 is springingly adjustable, which ensures firm contact with an uneven floor surface while the stand 10 remains unloaded. The caster 71 provides support for the weight of the post 20 when the stand 10 is not supporting the work piece 100, preventing the stand 10 from tipping over leg 77. As shown in FIGS. 2 and 4, the caster 78 on leg 74 is equipped with a brake for securing the work stand 10.

Once the work piece 100 is mounted on the work piece stand, as shown in FIGS. 3 and 4, the handle 31 must be rotated until the position of the second arm portion 33 relative to the first arm portion 30 disposes the center of gravity of the combination of work piece 100, the panel member 95, the support bar 87 and the arm 40 substantially along the axis of rotation of the rotating shaft 52. Once in this position, the worm handle 51 can be adjusted, thereby rotating the arm 40 and the attached work piece 100 in any position within a 360° rotation.

In conclusion, it will be understood that the invention may be embodied in other specific forms without departing from the spirit or central characteristics thereof. The present example and embodiment, therefore, is to be considered in all respects as illustrative and not restrictive, and the invention is not to be limited to the details given herein. Therefore, the scope of protection is only limited by the scope of the accompanying claims.

I claim:

1. A work piece stand for supporting a work piece, comprising:

a vertical post;

an arm;

means for pivotally interconnecting the arm to the post and defining an axis of rotation;

means for securing the work piece to the arm, the securing means including a panel member attached to a support bar, the panel member being attached to the arm and extending perpendicularly away from the arm, wherein both the panel member and the support bar include a plurality of apertures; and means for selectively positioning the arm relative to the post to maintain the center of gravity of a combination of the arm, the securing means, and the work piece disposed substantially along the axis of rotation, whereby the work piece remains substantially balanced about the axis of rotation to provide secure and easy rotation.

2. The work piece stand of claim 1, wherein the support bar has a plurality of brackets connected thereto, each bracket including an aperture and an elongated eyelet.

3. A work piece stand for supporting a work piece, comprising:

a vertical post;

an arm;

means for pivotally interconnecting the arm to the post and defining an axis of rotation;

means for securing the work piece to the arm in selective positions relative to the arm to situate the center of gravity of the work piece substantially along the axis of rotation, wherein the means for securing includes a panel member attached to a support bar, the panel member being attached to the arm and extending perpendicularly away from the arm, wherein both the panel member and the support bar include a plurality of apertures; and means for selectively positioning the arm relative to the post to maintain the center of gravity of a combination of the arm, the means for securing, and the work piece, disposed substantially along the axis of rotation, whereby the work piece remains substantially balanced about the axis of rotation to provide secure and easy rotation.

4. The work piece stand of claim 3, wherein the work piece includes a plurality of first retaining elements and the means for secvring the work piece to the arm comprises a plurality of second retaining elements for cooperating with the first retaining elements.

* * * * *